March 3, 1970  AKIO NAKANO  3,498,426
HYDRAULIC BRAKE OPERATING SYSTEM FOR A MOTOR VEHICLE
Filed Oct. 5, 1967  4 Sheets-Sheet 3
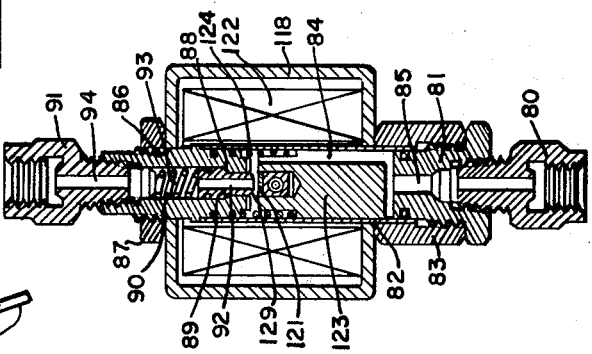
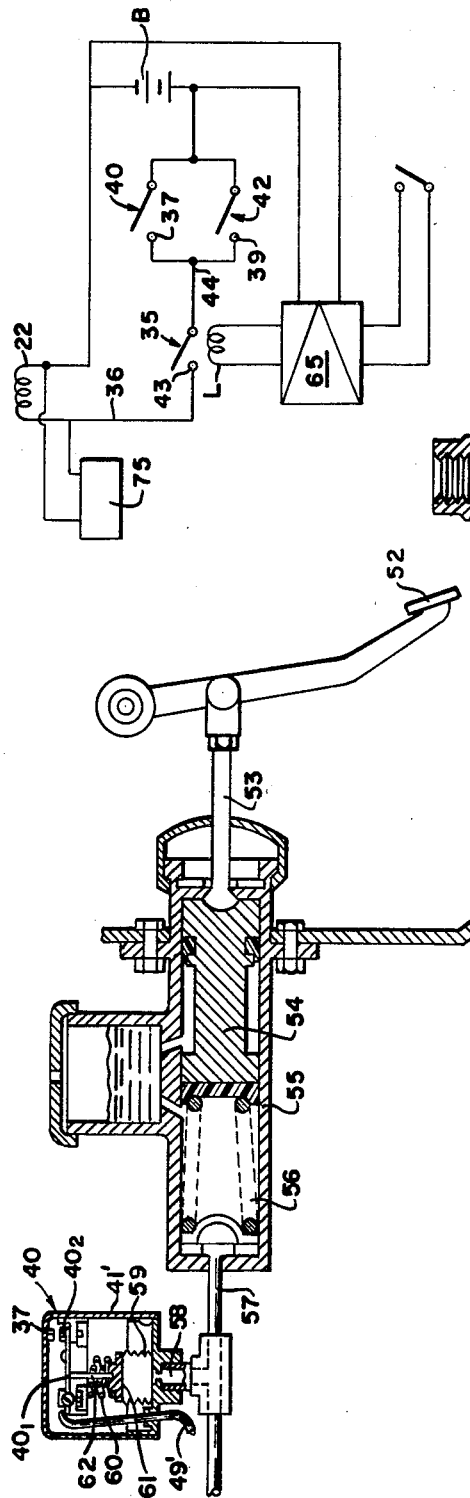
INVENTOR
Akio Nakano
BY Chandlee Pidgeon
AGENT

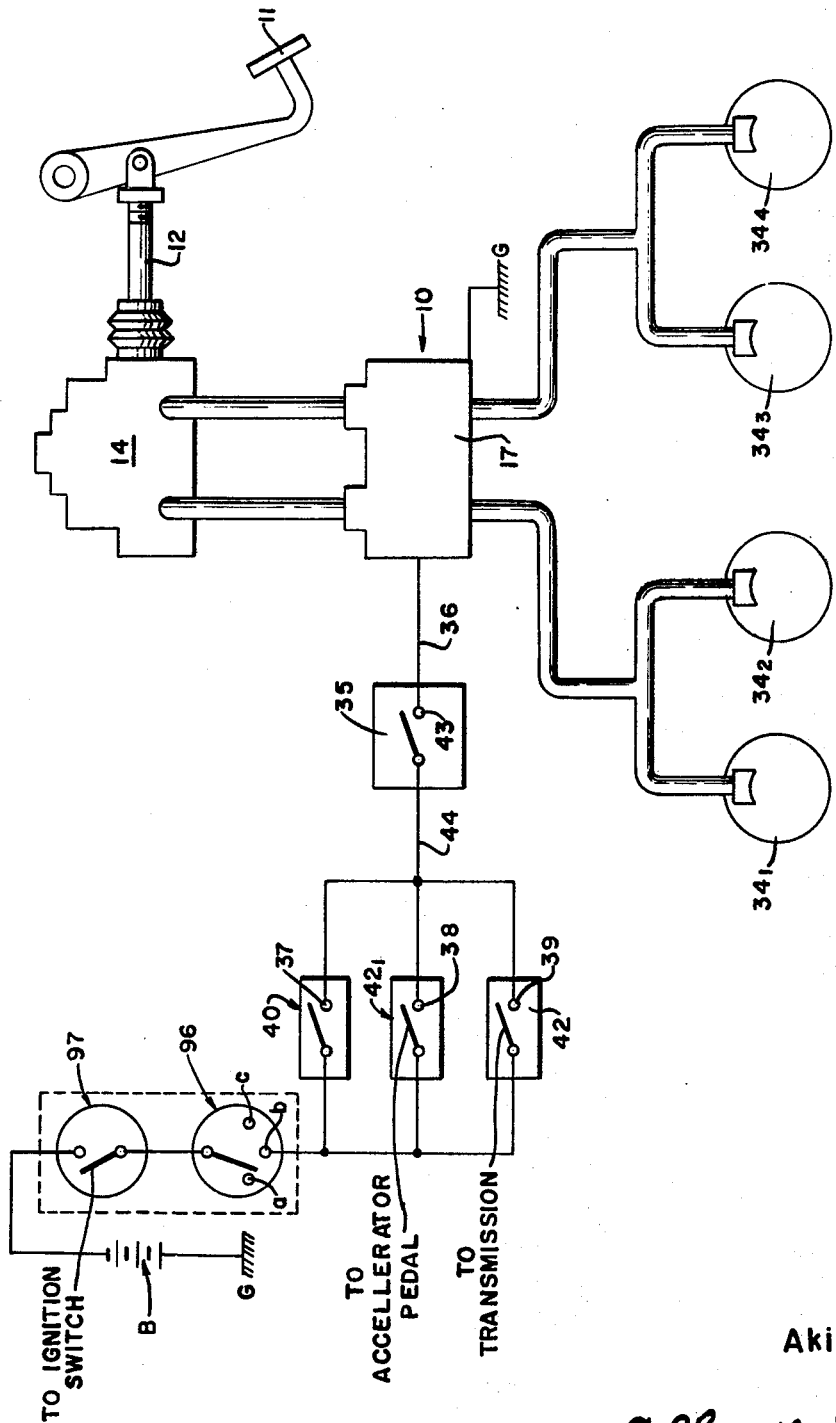

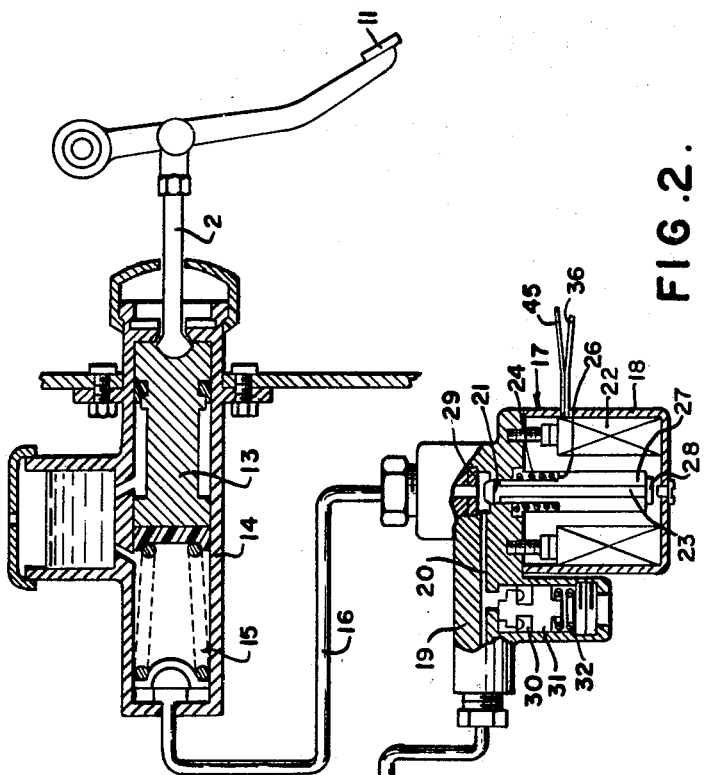
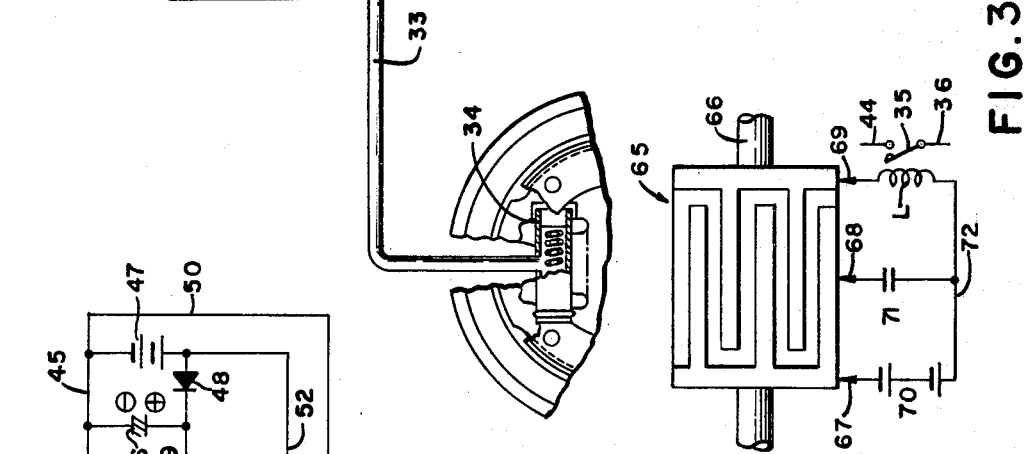
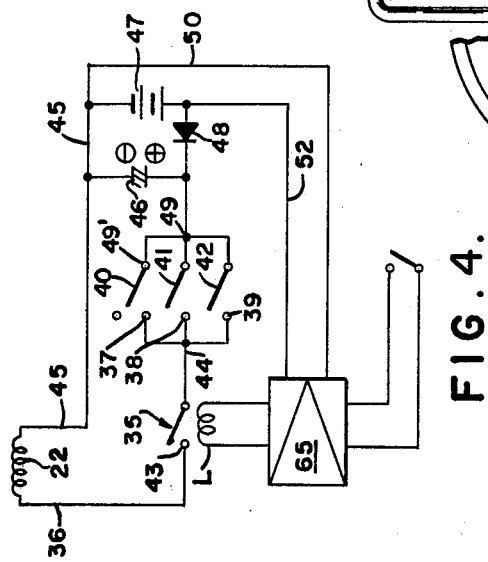

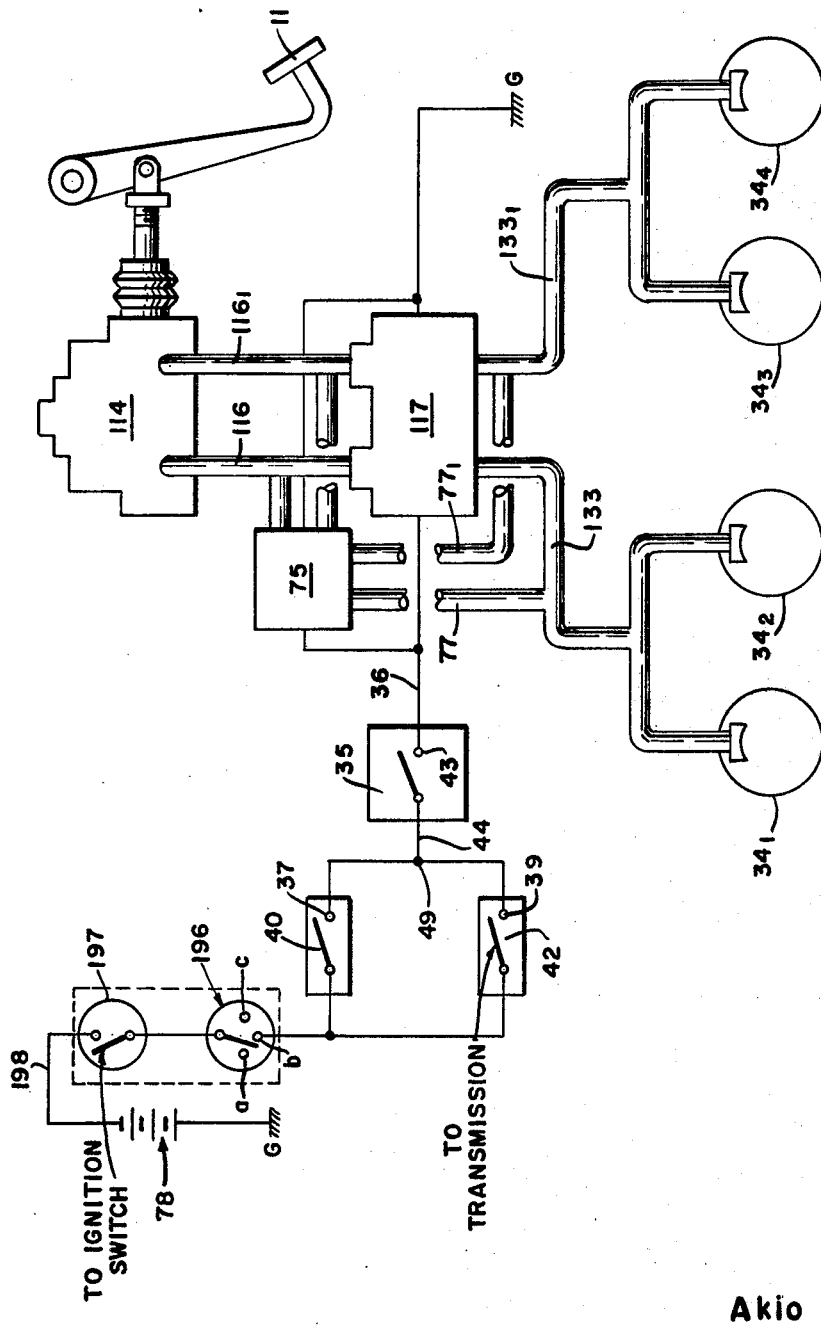

_United States Patent Office_

3,498,426
Patented Mar. 3, 1970

3,498,426
HYDRAULIC BRAKE OPERATING SYSTEM FOR A MOTOR VEHICLE
Akio Nakano, 12–2, 1-chome Honhaneda Ota-ku, Tokyo, Japan
Filed Oct. 5, 1967, Ser. No. 673,145
Claims priority, application Japan, Oct. 21, 1966, 41/16,910, 41/68,912, 41/97,355
Int. Cl. F16d 67/04
U.S. Cl. 192—13     3 Claims

ABSTRACT OF THE DISCLOSURE

In a motor vehicle a hydraulic brake system includes an electromagnetic valve in the fluid line between the master cylinder and the brake cylinders. A generator operated by rotation of the speedometer holds a normally closed relay in open position during movement of the vehicle. A fluid pressure clutch operating mechanism includes a clutch pedal and a pressure operated switch in the circuit to the electromagnetic valve. Closing of the speedometer controlled switch and the clutch controlled switch completes a holding circuit and applies holding pressure on the brake cylinders regardless of further operation of the brake pedal. Release of the clutch pedal opens the holding circuit and removes the holding pressure to permit operation of the vehicle.

---

This application relates to a hydraulic brake operating system for a motor vehicle and more particularly to a system wherein the brakes are conjointly controlled by the operation of the brake pedal or operator, the clutch pedal or operator and the speedometer. Pressure on the brake pedal or operator causes operation of the conventional hydraulic brake system. A switch, energized during operation of the speedometer, opens as the speed approaches zero. A second switch is energized by operation of the clutch pedal. An electromagnetic valve in the fluid line between the usual master cylinder and the brake cylinders controls the pressure in the brake cylinders, until released by release of the clutch pedal and rotation of the speedometer. The clutch pedal and the brake pedal having been released, the brakes are completely off and normal motion of the vehicle may proceed.

An object of this invention is to provide a brake system which prevents normal operation of the vehicle until after the fluid pressure has been removed in the fluid line for clutch operation and slow motion causes operation of the speedometer, causing a generator driven by the speedometer shaft to produce an E.M.F.

Another object of the invention is the provision of an electrically controlled holding means wherein operation of the clutch pedal creates a holding circuit for the brake system.

Other objects will become apparent from a consideration of the following specification taken with the accompanying drawings, which together form a complete disclosure of my invention.

In the drawings, wherein like parts are represented by like characters of reference throughout the several figures:

FIG. 1 is a diagrammatic representation of the brake operating control means;

FIG. 2 is a view, partly in section, of certain features shown in FIG. 1;

FIG. 3 is a diagrammatic elevation of the device of FIG. 3 with its associated circuitry;

FIG. 4 is a circuit diagram of the electric control for the brake pressure;

FIG. 5 is an elevation partly in section showing the clutch operating means and its associated means for controlling the brake pressure;

FIG. 6 is a circuit diagram for this control;

FIG. 7 is a section through a modified form of an electromagnetic valve used in this system; and FIG. 8 is a diagrammatic view of a modified form of the invention as shown in FIG. 1.

Referring now to FIGS. 1 and 2, the numeral 10 indicates generally the hydraulic system operated by the brake pedal 11, and includes a push rod 12 operating a piston 13 in the master cylinder 14 against the pressure exerted by the compression spring 15. This operation compresses the fluid forcing it through the pipe 16 into an electromagnetic valve 17, which comprises a housing 18, having a cover 19. In the cover 19, there is a channel 20 adapted to be closed by a valve head 21. The valve head 21 is operated by a coil 22 which, when energized, moves the valve stem 23 which acts as the core of the electromagnet. The valve 17 is normally open and held in that condition by the spring 24 operating against the shoulder 26 of the cylinder 27 resting on the head 28 of the valve stem 23. The valve head 21 closes against the valve seat 29.

Operation of the piston 13 forces fluid into the chamber 30 against the pressure on the piston 31 exerted by the spring 32. After the valve 17 closes, as will appear later, the pressure in the line 33 and the brake cylinder 34 is maintained. The brake cylinder 34 is representative of the cylinders for the front and rear wheel brakes of the vehicle, as indicated by $34_1$, $34_2$, $34_3$, and $34_4$ in FIG. 1.

The coil 22 is energized by closing the switch 35 and the switch 40. Line 36 from switch contacts 37, 38 and 39 of switches 40, 41 and 42, respectively, connects to coil 22, and line 44 connects contact 43 of switch 35 with coil 22. From coil 22, line 45 connects the negative lead of condenser 46 and the negative lead of battery 47. The positive lead of the battery 47 is connected to the diode 48 which is connected to the positive lead of the condenser 46, and to the junction 49 for the leads to the switches 40, 41 and 42. Lead 50 connects lead 45 to the generator 65 and lead 52 connects the positive lead to the battery 47 to the generator 65.

Switch 35 is energized by coil L connected to a generator 65 operated by the speedometer shaft 66. The E.M.F. generated by the generator 65 is collected by brushes 67, 68 and 69. The brush 67 is connected to battery 70 and brush 68 connects to a condenser 71, and brush 69 connects to the coil L. Battery 70, condenser 71 and coil L are tied together by line 72.

Switch 40 is enclosed in a housing 41' and comprises the fixed contact 37 and the movable arm $40_1$ having the contact $40_2$. The switch 40 is operated by movement of the clutch pedal 52 operating push rod 53, piston 54 in a master cylinder 55 against the pressure of the compression spring 56, forcing fluid from the cylinder 55 through the pipe 57 to the clutch mechanism. This fluid pressure in the pipe 57 passes into the tube 58 and the bellows 59 expanding same against the spring 60. The cap 61 of the bellows 59 connects by means of a rod 62 to the switch arm $40_1$ so that pressure in the line 57 closes the contacts 37, $40_2$ allowing E.M.F. to pass from the line 49' to the coil 22 when the switch 40 is closed. Switch 42 connects to the operator for the transmission and is closed when the transmission is in neutral.

In FIG. 6 I show a circuit diagram wherein switch 40 is the switch 40 of FIGS. 4 and 5 and switch 35 is the switch 35 of FIGS. 1, 3 and 4. When either the switch 40 or the switch 42 and the switch 35 are closed, coil 22 is energized. Switch $42_1$ is connected to the accelerator pedal and closes when pressure is released to allow vehicle to slow or stop.

The block diagram 75 represents a compressor system preferably employing an electromagnetic pump operating with the modified form of the invention shown in FIG. 8. The electromagnetic valve system 117 operates in a manner similar to the action of the system 17, except that there are two electromagnetic valves and the fluid pressure is controlled to two lines 133 and $133_1$ instead of one line 33, providing independent control for the front and rear wheels of the vehicle. As the pressure in the magnetic valve system 117 is removed, the pump system 75 takes over and supplies pressure through the fluid lines 77 and $77_1$ respectively to the lines 133 and $133_1$ to maintain braking pressure. Pressure on brake pedal 11 through push rod 12, builds up pressure in the master cylinder 114 to pressurize the lines 116 and $116_1$. An E.M.F. from battery 78 operates the pumping system 75, being connected through switches 35 and either 40 or 42 and coil 22.

FIG. 7 shows an alternative electromagnetic valve system. A body 118 houses a coil 122. An inlet fitting 80 is attachable to a fluid line such as 16 or 116, leading to a master cylinder 14 or 114. The inlet fitting 80 is threaded into a bushing 81 attached to a cylinder 82 by means of a nut 83. A valve core 123 has a groove 84, connected to inlet 80 by a tubulature 85. A valve member 121 in the upper end of the core 123 seats against valve seat 129 when the coil 122 is energized, but is retained away by means of the spring 124 in the same manner as with valve member 21 and spring 24. A replaceable valve seat 129 is retained in a fitting 86 attached to the cylinder 82 and held by the nut 87. The valve seat 129 has a shoulder 88 that rests on a ledge 89 in the interior of the fitting 86, and is spring held by a spring 90. An outlet fitting 91 is threaded into the fitting 86 and may be connected to a line such as line 33 or 133. Fluid channels 92, 93 and 94 in valve seat 129, fitting 86 and fitting 91, respectively, conduct fluid through the electromagnetic valve system when the valve means 121 is not seated on the seat 129.

The electrical system is the usual single wire type with the customary grounds as shown in FIGS. 1 and 8. Switch 96 is manually operated and has three positions $a$, $b$ and $c$. At position $a$, the electromagnetic valve circuit is open; at position $b$, the electromagnetic valve circuit is closed; at position $c$, the circuit is temporarily opened, but is automatically returned to position $b$.

In FIG. 8, the switch 196 has the same functions and positions as the switch 96 and is manually operated. The switch 197 is connected to the ignition switch to operate concurrently therewith. The line 198 connects the switch 197 to one terminal of the vehicle battery 78, the other terminal of which is grounded.

The operation of the devices of this invention should be apparent from the preceding description, but the following is offered as a resumé.

When the ignition switch is closed, the switch 97 or 197 is closed and a circuit is made to one terminal of each of the switches 40, 42 and $42_1$. Switches 40, 42 and $42_1$ are normally open. One terminal of switch 35 is connected to one terminal of each of the switches 40, 42 and $42_1$. The switch 35 is normally open, and is held in that position by means of the coil L which is energized by rotation of the generator 65 driven by the speedometer shaft 66. When it is desired to stop the vehicle, the brake pedal 11 is depressed creating pressure in the fluid lines 16 and 33 and the brake cylinders 34. As the speed of the motor drops to idling speed and rotation of the generator 65 stops, the switch 35 closes, completing the circuit to one side of the coil 22 of the electromagnetic valve. Depressing the clutch pedal 52 creates pressure in the clutch fluid line 57 and in the bellows 59 to close the switch 40 and completes the circuit of the electromagnetic valve 17. The valve head 21 seats against the seat 29 and the brake pressure holds, even though the brake pedal be released.

In a vehicle having an automatic transmission, switch 42 would be omitted and switch 40 would operate when fluid pressure is employed to operate the transmission selectors. Upon release of the clutch pedal 52, the pressure controlling switch 40 is relieved and the vehicle is ready to move. Release of the brake pedal 11 causes pressure to be relieved in the brake cylinders 34, the coil 22 having been de-energized by opening of the switch 40, thus opening the electromagnetic valve 17.

The operation of the modified form of the invention of FIG. 9 is quite like that in the other figures, except that the electromagnetic valve device 117 embodies two electromagnetic valves similar to 17, there being separate controls for the front and the rear wheels of the vehicle. Also the pumping system 75 assists in maintaining the pressure in the system.

Having described my invention in certain preferred aspects, I desire it to be understood that various modifications and changes may be made within the skill of the art and the scope of the appended claims.

I claim:

1. In a hydraulic brake system for motor vehicles, having a fluid pressure brake system including a master cylinder and fluid lines connecting said master cylinder with wheel brake cylinders, the improvement comprising a fluid pressure operated clutch, electromagnetic valve means in the line from the master cylinder to the brake cylinders, means responsive to motion of the vehicle affecting said electromagnetic valve means, and means connected with the clutch operating means for completing the circuit to the electromagnetic valve means, whereby pressure is maintained in the brake cylinders without regard to brake pedal operation, said means responsive to the motion of the vehicle comprising a generator driven by the speedometer shaft, and a switch normally closed but held open when the generator is running.

2. The hydraulic brake system according to claim 1, wherein the means connected with the clutch operating means comprises a switch, means operated by fluid pressure in the clutch operating system to close the switch and complete a circuit to the electromagnetic valve means to hold a valve in closed position.

3. The hydraulic brake system according to claim 1, wherein the switch is a normally closed relay held open by the E.M.F. generated by rotation of the generator in the speedometer shaft.

References Cited

UNITED STATES PATENTS

| | | | |
|---|---|---|---|
| 2,136,410 | 11/1938 | Boldt et al. | 192—13 XR |
| 2,141,689 | 12/1938 | Eaton | 192—13 |
| 2,183,803 | 12/1939 | Betts | 192—13 |
| 2,217,141 | 8/1940 | Sprenkle | 192—13 |
| 2,235,412 | 3/1941 | Weiss et al. | 192—13 XR |
| 2,277,584 | 3/1942 | Freeman | 192—13 XR |
| 2,877,880 | 3/1959 | Peebles et al. | 192—3 |
| 2,978,080 | 4/1961 | Beatty | 192—3 |

MARTIN P. SCHWADRON, Primary Examiner

L. J. PAYNE, Assistant Examiner

U.S. Cl. X.R.

192—3